United States Patent [19]

Umezawa

[11] 4,449,135

[45] May 15, 1984

[54] INK EJECTION HEAD

[75] Inventor: Michio Umezawa, Kawasaki, Japan

[73] Assignee: Ricoh Company, Ltd., Tokyo, Japan

[21] Appl. No.: 449,038

[22] Filed: Dec. 13, 1982

[30] Foreign Application Priority Data

Dec. 23, 1981 [JP] Japan ............................... 56-207139
Dec. 23, 1981 [JP] Japan ............................... 56-207140

[51] Int. Cl.$^{3}$ ............................................ G01D 15/18
[52] U.S. Cl. .................................. 346/75; 346/140 R
[58] Field of Search .............................. 346/75, 140 R

[56] References Cited

U.S. PATENT DOCUMENTS 4,005,435 1/1977 Lundquist et al. ...................... 346/1
4,379,303 5/1983 Nakagaki et al. ..................... 346/75

*Primary Examiner*—E. A. Goldberg
*Assistant Examiner*—Gerald E. Preston
*Attorney, Agent, or Firm*—David G. Alexander

[57] ABSTRACT

An ink ejection head having a body and a nozzle member which is mounted on the head body through a nozzle holder. To facilitate the ease of machining, the nozzle member is formed with a generally cup-shaped recess first and then a nozzle hole for ejecting ink. The space defined between the wall of the cup-shaped recess and the nozzle holder is filled with a projection extending from the nozzle holder or a flexible member. A passageway extends throughout the projection or the flexible member to provide fluid communication between the nozzle hole and an ink chamber defined in the head body. The projection or the flexible member minimized a diametrical step conventionally defined between the nozzle hole and the cup-shaped recess, so that bubbles drawn into the nozzle hole upon termination of an ink ejection can be released to the outside within a short period of time.

5 Claims, 6 Drawing Figures

INK EJECTION HEAD

BACKGROUND OF THE INVENTION

The present invention relates to an improvement in a portion of an ink ejection head which connects a nozzle hole and an ink chamber to each other.

In a charge and deflection type ink jet printing apparatus, ink is fed under pressure to an ink ejection head and ejected from a nozzle hole thereof as a jet of ink. The ink jet is separated into a string of droplets at a predetermined position and selectively charged and deflected to print out data on a sheet of paper. It is a prerequisite in this type of printer that the ejection of ink be sharply cut off in response to an interruption command. If any transient state occurs in which the intensity of the ink jet is slowly run down, the ink droplets will be simply dropped to smear a deflection electrode and/or charging electrodes located in front of the nozzle hole, damaging the printer in the worst case. Moreover, should the neighborhood of the nozzle hole be smeared by the ink which drips along the head, the direction of ink ejection would be effected to result in inaccurate reproduction of data. It has been customary to construct an ink ejection head such that, as soon as a solenoid operated valve for ink supply is closed, vacuum momentarily develops in an ink chamber inside the head in order to immediately cut off the ink ejection. Thus, the vacuum in the ink chamber sucks ink from the neighborhood of the nozzle hole into the ink chamber thereby interrupting the ink ejection instantaneously.

However, not only the ink but air are sucked into the ink chamber through the nozzle hole so that bubbles are allowed to stay in the ink chamber. If the bubbles remain a long time in the ink chamber even after the start of the next ink ejection, the bubbles create an undesirable damper which lowers the transmission efficiency of vibration necessary for separating a jet of ink into droplets. The lowered transmission efficiency dislocates the predetermined position where the jet is to separate into droplets and, thereby, causes the charging efficiency to fluctuate. Then, the amount of deflection of a charged ink droplet would be varied to disturb an image reproduced on a sheet of paper. It is important, therefore, to promptly dissipate the bubbles drawn into the ink chamber when ink ejection is resumed after a certain period of interruption.

SUMMARY OF THE INVENTION

An ink ejection head embodying the present invention has a body and a nozzle member fixed to the head through a nozzle holder, the nozzle member being machined to be formed with a generally cup-shaped recess first and then a nozzle hole. An ink chamber is formed within the head body to be supplied with ink from outside the head. A spacer fills a space defined between the wall of the cup-shaped recess and the nozzle holder. A through passageway extends throughout the spacer to provide fluid communication between the ink chamber and the nozzle hole.

Preferably, the ink chamber is generally horn-shaped the diameter of which progressively decreases toward an end thereof adjacent to the nozzle hole.

Conveniently, the spacer comprises a projection extending from the nozzle holder. The projection abuts against the wall of the cup-shaped recess. The projection may be replaced by a flexible member which bifunctions as a packing for maintaining the ink chamber fluid-tight.

It is an object of the present invention to provide an ink ejection head which readily discharges bubles drawn into its nozzle hole to the outside.

It is another object of the present invention to provide an ink ejection head which minimizes a time period before a normal condition of printing is achieved.

It is another object of the present invention to provide an ink ejection head which improves the quality of data reproduction.

It is another object of the present invention to provide an ink ejection head which can be produced without resorting any special or precision machining.

It is another object of the present invention to provide a generally improved ejection head.

Other objects, together with the foregoing, are attained in the embodiments described in the following description and illustrated in the accompanying drawings.

DESCRIPTION OF THE PREFERRED EMBODIMENTS

While the ink ejection head of the present invention is susceptible of numerous physical embodiments, depending upon the environment and requirements of use, substantial numbers of the herein shown and described embodiments have been made, tested and used, and all have performed in an eminently satisfactory manner.

Figure 1A:
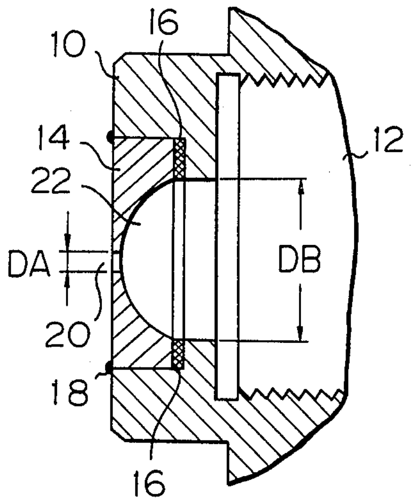
Fig. 1a PRIOR ART
FIGS. 1*a* and 1*b* are sections showing a nozzle portion of a prior art ink ejection head.
Figure 1B:
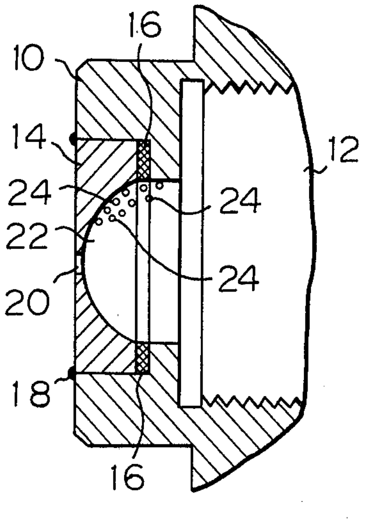
Fig. 1b PRIOR ART

To facilitate understanding the present invention, a brief reference will be made to a prior art ink ejection head, depicted in FIGS. 1*a* and 1*b*. The ink ejection head includes a head holder 10 which has thereinside an ink chamber 12. Ink is fed from the right to the left in the drawing to fill up the ink chamber 12. A nozzle member 14 is fit in a recess formed in the leftmost end of the head holder 10. The ink chamber 12 is kept fluid-tight by a packing or sealing 16 interposed between the nozzle holder 10 and the nozzle member 14. An annular projection 18 extends from the edge of the recess in the nozzle holder 10 and is crimped radially inwardly to rigidly retain the nozzle member 14 within the recess.

The nozzle 14 is formed with a nozzle hole 20 at its diametrically central position and a generally cup-shaped bore or recess 22 in its axially inner end. The bore 22 is communicated with the nozzle hole 20 at one end and the ink chamber 12 at the other end. Ink, therefore, is communicated from the chamber 12 to the nozzle hole 20 via the recess 22 and ejected from the nozzle hole 20 toward a sheet of paper (not shown).

The diameter DA of the nozzle hole 20 is as small as about 30 μm while the diameter DB of the end of the recess 22 adjacent to the chamber 12 is about 1.7 mm. Due to such a small diameter of the nozzle hole 20, the nozzle 14 has to be machined to form the cup-shaped recess 22 first and then the nozzle hole 20. This machining procedure makes it quite difficult to reduce the diameter DB of the recess 22. When bubbles are sucked into the head through the nozzle hole 20 upon termination of an ink ejection, as indicated by the reference numeral 24 in FIG. 1*b*, they are caused to stay in an upper portion of the cup-shaped recess 22 whose diameter is far larger than that of the nozzle 20. After the start of the next ink ejection from the head, a substantial period of time is required for all the bubbles 24 to be dissipated to the outside.

Figure 2:
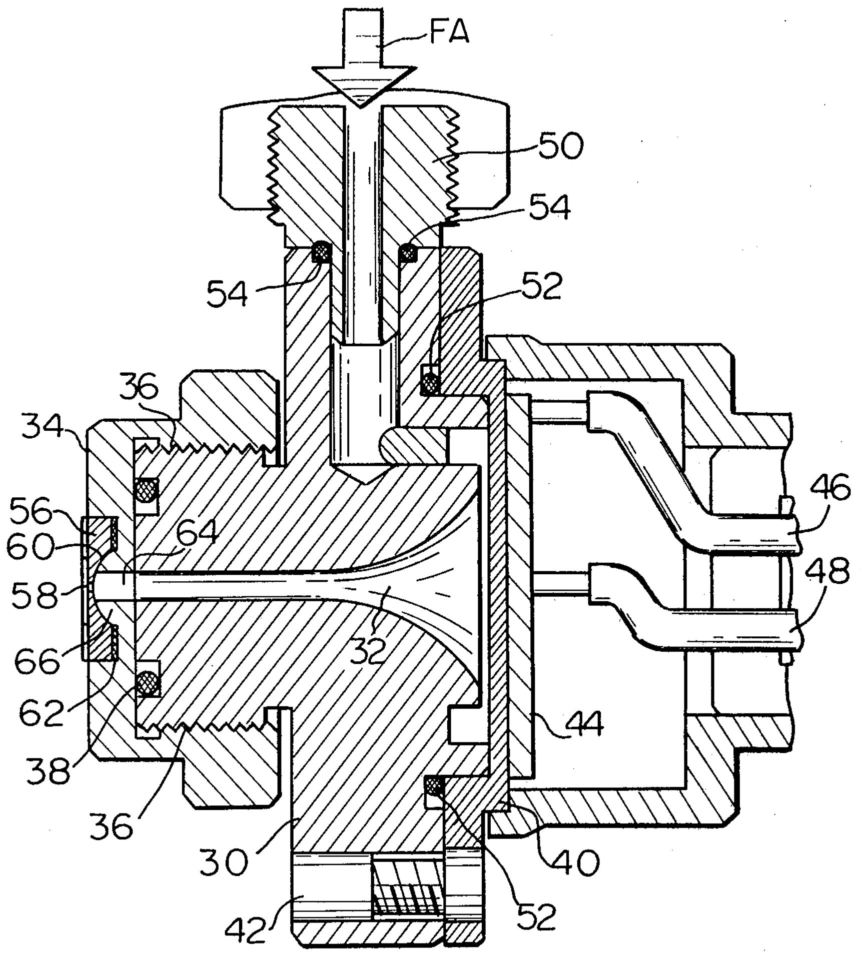
FIG. 2 is a section of an ink ejection head embodying the present invention.
Figure 3:
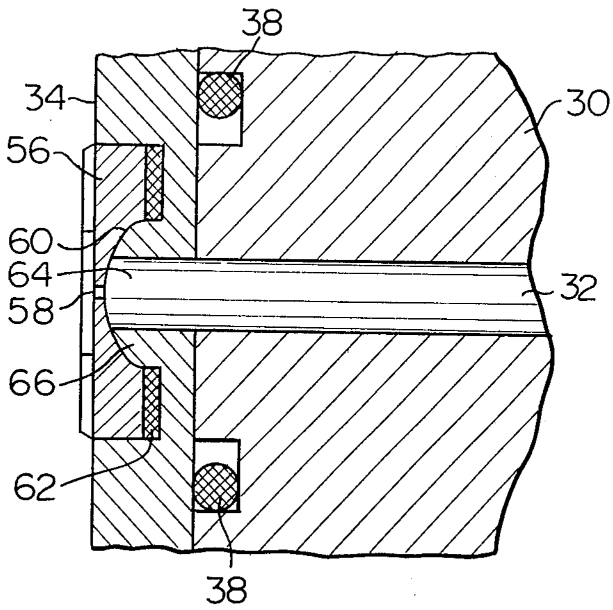
FIG. 3 is a fragmentary enlarged section of the ink ejection head shown in FIG. 2.

Referring now to FIGS. 2 and 3, a new and improved ink ejection head embodying the present invention will be described which is free from the problem discussed above. As shown, the ink ejection head comprises a body 30 which is formed with a generally horn-shaped ink chamber 32. The diameter of the ink chamber 32 progressively decreases from the right to the left as viewed in FIG. 2. A nozzle holder 34 is rigidly mounted on the head body 30 through a threaded portion 36 which is formed on the outer periphery of a leftmost projection of the head body 30. If desired, the rigid connection of the nozzle holder 34 with the head body 30 may rely on crimping or caulking along the circumference as described with reference to FIG. 1*a*. A packing 38 is interposed between the head body 30 and nozzle holder 34 in order to maintain the horn-shaped ink chamber 32 fluid tight.

A vibration plate 40 is fastened to the right end of the head body 30 by a bolt and nut assembly 42. The vibration plate 40 faces the ink chamber 32 at its left surface and carries a piezoelectric element or like vibrator element 44 on its right surface. The vibrator element 44 may be bonded or otherwise secured to the plate 40. Leads 46 and 48 extend from a power source (not shown) to the vibrator 44 so that a voltage applied from the power source causes the vibrator 44 into vibration. This vibration is transmitted to the vibration plate 40 and therethrough to the ink inside the ink chamber 32.

The ink is introduced into the chamber 32 through an inlet joint 50 as indicated by an arrow FA, the inlet joint 50 being received in an upper portion of the head body 30. Packings 52 and 54 are respectively positioned between the head body 30 and the vibration plate 40 and between the head body 30 and the inlet joint 50, thereby ensuring fluid-tight sealing for the ink chamber 32. A nozzle member 56 is mounted in a radially central area of the leftmost end of the nozzle holder 34 as viewed in FIG. 2. The nozzle member 56 is formed with a nozzle hole 58 at its center and a generally cup-shaped recess 60 at its inner end. The recess 60 is communicated with the nozzle hole 58. A packing 62 is disposed between the nozzle holder 34 and the nozzle member 56 so as to provide fluid-tight sealing for the ink chamber 32.

As best shown in FIG. 3, the nozzle holder 34 is formed with a through passageway 64 at its center which is aligned with and communicated with the horn-shaped ink chamber 32. The nozzle holder 34 has a projection 66 in its section which is provided with the passageway 64 and opposed by the nozzle 56. The outer contour of the projection 66 is exactly complementary to the inner contour of the recess 60 of the nozzle 56. Thus, the projection 66 is accurately engaged in the recess 60 so that the ink chamber 32 is communicated to the nozzle hole 58 via the passageway 64.

In operation, ink is supplied to the ink chamber 32 through the inlet joint 50 as indicated by the arrow FA in FIG. 2. When a voltage is applied across the vibrator 44, the resulting vibration of the vibrator 44 is transmitted to the ink inside the chamber 32 via the vibration plate 40. As a result, a jet of ink is ejected from the nozzle hole 58 toward a sheet of paper (not shown).

As shown as the ink ejection is terminated, vacuum develops within the ink chamber 32. The vacuum sucks into the ink chamber 32 not only the ink but part of the outside air through the nozzle hole 58 and permits the air to stay as bubbles in the ink. In accordance with the present invention, such bubbles are quickly discharged to the outside partly because the ink chamber 32 has its diameter progressively reduced toward the nozzle hole 58 and partly because the recess 60 of the nozzle 56 is partly filled with the projection 66.

The passageway 64 in the nozzle holder 34 is machined to have a diameter of, for example, 0.4–0.6 mm which is achievable as easily as the diameter of the nozzle hole 58.

Figure 5:
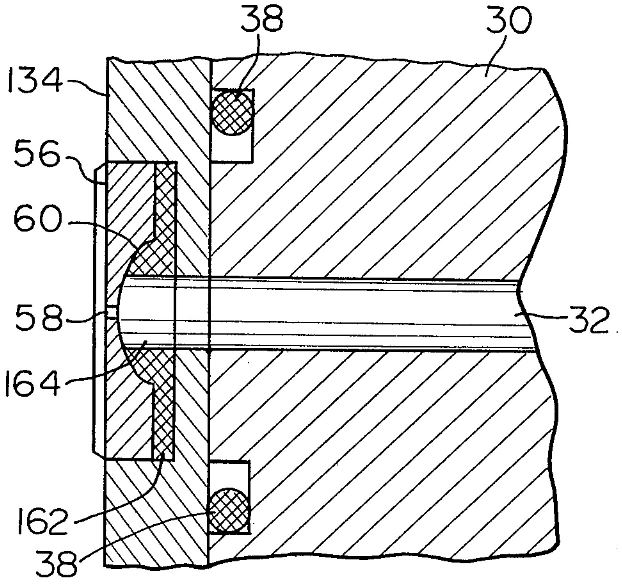
FIG. 5 is a fragmentary enlarged view of the ink ejection head shown in FIG. 4.
Figure 4:
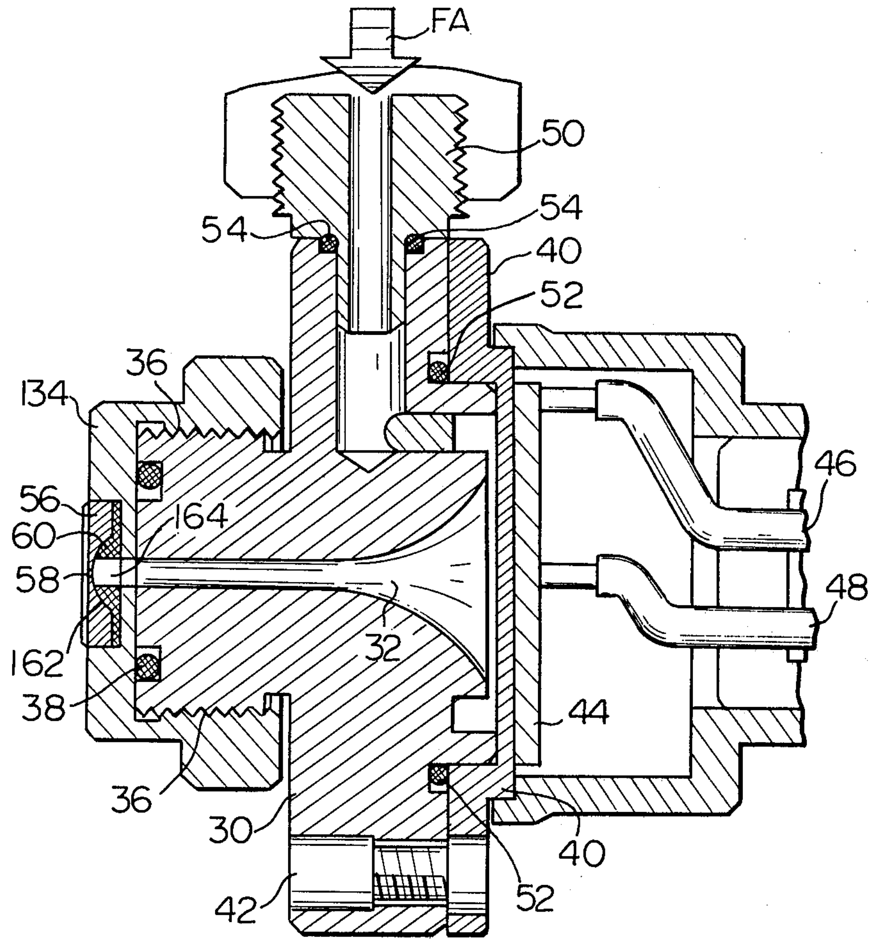
FIG. 4 is a section of another embodiment of the present invention.

Referring to FIGS. 4 and 5, another embodiment of the ink ejection head of the present invention is illustrated. This embodiment is essentially similar to that shown in FIGS. 2 and 3 and, therefore, its structural elements common to those of the first embodiment are designated by like reference numerals and description thereof will be omitted for simplicity.

In FIGS. 4 and 5, a nozzle holder 134 is not formed with the projection 66 which is shown in FIGS. 2 and 3. In detail, the projection 66 is replaced by a flexible member 162 which is formed with a through passageway 164 and retained in the space defined between the wall of the recess 60 of the nozzle body 56 and the nozzle holder 134. The flexible member 162 is made of a suitable flexible material such as rubber or soft plastics and functions in three ways at the same time: maintaining the ink chamber 32 fuild-tight like the packing 62 shown in FIGS. 2 and 3, accurately filling up the clearance between the nozzle body 56 and the recess 60, and providing fluid communication between the ink chamber 32 and the nozzle hole 58. With this arrangement, even though the machining accuracy of the nozzle holder 134 and nozzle body 56 may be rather insufficient, the flexible member 162 successfully fills up the resultant gap between the wall of the recess 60 and the nozzle body 56.

In summary, it will be seen that the present invention provides an ink ejection head which readily and quickly discharges bubbles sucked into its ink chamber, efficiently forms ink droplets to promote high quality data reproduction, and eliminates the need for special or precision machining.

Various modifications will become possible for those skilled in the art after receiving the teachings of the present disclosure without departing from the scope thereof. For example, the projection 66 shown in FIGS. 2 and 3 and the flexible member 162 shown in FIGS. 4 and 5 may be used in combination. The configuration of the ink chamber is not limited to the horn-shape shown and described but may be replaced with another as long as it can well communicate with the ink chamber.

What is claimed is:

1. An ink ejection head having a body and a nozzle member fixed to the head through a nozzle holder, the nozzle member being machined to be formed with a generally cup-shaped recess first and then a nozzle hole, comprising:

an ink chamber formed within the head body to be supplied with ink from outside the head;

a spacer for filling a space defined between the wall of the cup-shaped recess and the nozzle holder; and a through passageway formed in said spacer to provide fluid communication between the ink chamber and the nozzle hole.

2. An ink ejection head as claimed in claim 1, in which the ink chamber is generally horn-shaped the diameter of which progressively decreases toward an end thereof adjacent to the nozzle hole.

3. An ink ejection head as claimed in claim 2, in which the spacer comprises a projection extending from the nozzle holder, said projection abutting against the wall of the cup-shaped recess.

4. An ink ejection head as claimed in claim 2, in which the spacer comprises a flexible member.

5. An ink ejection head as claimed in claim 4, in which the flexible member bifunctions as a packing for maintaining the ink chamber fluid-tight.

* * * * *